(12) United States Patent
Heider et al.

(10) Patent No.: US 7,810,546 B2
(45) Date of Patent: Oct. 12, 2010

(54) LINING SUPPORT PLATE AND ASSOCIATED PRODUCTION METHOD

(75) Inventors: Carsten Heider, Burscheid (DE); Cristobal Montero Bautista, Essen (DE); Armin Eckert, Waltrop (DE)

(73) Assignee: TMD Friction Services GmbH, Leverkusen (DE)

( * ) Notice: Subject to any disclaimer, the term of this patent is extended or adjusted under 35 U.S.C. 154(b) by 867 days.

(21) Appl. No.: 10/577,248

(22) PCT Filed: Oct. 21, 2004

(86) PCT No.: PCT/EP2004/011915

§ 371 (c)(1),
(2), (4) Date: Jan. 24, 2007

(87) PCT Pub. No.: WO2005/042999

PCT Pub. Date: May 12, 2005

(65) Prior Publication Data

US 2007/0215305 A1      Sep. 20, 2007

(30) Foreign Application Priority Data

Oct. 30, 2003    (DE) ................................ 103 50 725

(51) Int. Cl.
*B22D 19/00*   (2006.01)
*F16D 69/04*   (2006.01)
(52) U.S. Cl. ..................... 164/98; 188/250 G
(58) Field of Classification Search ................... 164/98; 29/527.5; 188/250 G
See application file for complete search history.

(56) References Cited

U.S. PATENT DOCUMENTS 4,799,579 A    1/1989   Myers et al.

(Continued)

FOREIGN PATENT DOCUMENTS

DE         195 32 019 C1    2/1997

(Continued)

OTHER PUBLICATIONS

Translation of Abstract - Japanese Utility Model No. 06-008138.

(Continued)

*Primary Examiner*—Kevin P Kerns
(74) *Attorney, Agent, or Firm*—Charles P. Boukus, Jr.

(57) ABSTRACT

A lining support plate includes a base plate of cast metal and a plurality of pins which extend into the base plate and project from a support surface to anchor a friction lining material on the base plate. In the manufacture of the lining support plate, a support plate pattern (1) with a plurality of cavities (4) in a lateral face is provided. Pins (6a-6d) are inserted into the cavities and partially protrude from the support plate pattern (1). The support plate pattern (1) and the protruding portions of the pins (6a-6d) are surrounded by a moulding compound which is compressed and/or cured. When the support plate pattern (1) is removed, the pins (6a-6d) are left behind in the moulding compound and a support plate casting cavity is formed. A melt is poured into the cavity, surrounding the portions of the pins (6a-6d) protruding into the cavity. Once the melt has solidified, the lining support plate can be removed from the mould.

5 Claims, 1 Drawing Sheet

U.S. PATENT DOCUMENTS 6,279,222 B1 * 8/2001 Bunker et al. .............. 29/527.5

FOREIGN PATENT DOCUMENTS

| DE | 696 02 602 T2 | | 2/1997 |
| DE | 298 04 619 U1 | | 6/1998 |
| EP | 760436 B1 | | 3/2000 |
| GB | 2 299 382 A | * | 10/1996 |
| GB | 2303891 A | | 3/1997 |
| JP | 53-056475 | | 5/1978 |
| JP | 04-175524 | | 6/1992 |
| JP | 06-008138 U | | 2/1994 |
| JP | 9-111393 A | * | 4/1997 |
| JP | 11-230208 | | 8/1999 |

OTHER PUBLICATIONS

Computer Translation of JP 06-008138 U from Japanese Patent Office.

* cited by examiner

LINING SUPPORT PLATE AND ASSOCIATED PRODUCTION METHOD

BACKGROUND OF THE INVENTION (1) Field of the Invention

The invention relates to a method of producing a lining support plate. The invention further relates to a lining support plate with a cast metal base plate with a support surface to receive a friction lining material, wherein retaining elements project out of the support surface.

(2) Description of Related Art

Brake and clutch linings usually comprise a support plate with a friction lining material pressed onto it. In order to improve the adhesion between the support plate and the friction lining material an adhesive is frequently applied to the support plate before the friction lining material is pressed on. This adhesive is generally an adhesive based on a phenolic resin. If need be an underlayer material can be disposed between the adhesive and the friction lining material to damp vibrations occurring during the braking operation. In such brake and clutch linings the support plate is made from steel. A disadvantage of the usual construction of a brake or clutch lining is, on the one hand, that the adhesive often does not withstand the high temperatures and shear forces which occur in the friction lining during braking. In some circumstances this leads to a detachment of the friction lining material from the support plate and thus to destruction of the brake or clutch lining. On the other hand, because of the steel used in the production of the support plate the weight of such an arrangement is very high.

In order to solve the problem of the adhesive which does not withstand the high temperatures and shear forces, friction linings have been developed in which the connection between the support plate and the friction lining material has been improved. Thus for example holes can be introduced into the support plate. These can be filled with friction lining material during compression. Thus a connection between the friction lining material and the support plate is produced which withstands the shear forces better. It is known for example for a plurality of depressions to be introduced by laser beams into the surface of the support plate facing the friction lining, whereby some of the material removed from the depressions is thrown up on the edge thereof.

Furthermore, it is known to produce retaining elements on the side of the support plate facing the friction lining material. This can be done in such a way that either the retaining elements are worked out of the support plate material, for example in the form of an indentation and/or machining, or the retaining elements are applied to the support plate, for example in the form of lattices or pins which are welded or sintered on.

However, the methods referred to above for the improvement of the connection between the support plate and the friction lining material are not suitable for reducing the weight of a friction lining, since all methods are based on a support plate made from steel.

SUMMARY OF THE INVENTION

The object of the present invention is to provide friction linings of reduced weight with an improved connection between a friction lining material and a lining support plate.

This object is achieved by a providing a lining support plate including a cast metal base plate with a support surface to receive a friction lining material and a plurality of pins which are cast into the base plate, wherein a first portion of each pin protrudes into the base plate and a second portion of each pin projects out of the support surface of the base plate to anchor the friction lining material.

According to the invention a lining support plate is produced in which:

a) a support plate pattern is prepared, whereby the support plate pattern has on one lateral face which corresponds to the face of the support plate facing a friction lining a plurality of recesses into each of which a pin is introduced in such a way that the pin partially projects out of the support plate pattern;

b) the support plate pattern and the portions of the pins projecting out of the support plate pattern are surrounded by a moulding compound, the moulding compound is compressed and/or cured, the support plate pattern is removed from the cured and/or compressed moulding compound in such a way that the pins with the portions projecting out of the support plate pattern remain in the moulding compound and a support plate casting cavity is formed into which the pins protrude;

c) a melt is poured into the support plate casting cavity, whereby the portions of the pins protruding into the support plate casting cavity are surrounded by the melt;

d) the melt is left to solidify in such a way that a cast iron lining support plate is formed; and e) the lining support plate is removed from the mould.

A pin should be understood here to mean any body which extends over a given length in such a way that over a part of this length it can be introduced into a recess in the lining support plate pattern, for example a body of any shape which is at least partially cylindrical or conical.

By the use of a melt which solidifies to form a cast iron support plate a reduction in weight of the lining support plate is achieved. This is an increasingly important aspect of the production of friction linings, since the automobile industry is making efforts to reduce the overall weight of its motor vehicles in order to lower their fuel consumption. Furthermore, the reduction in the weight of the lining support plate leads to a reduction in the transport costs.

By comparison with producing projecting retaining elements from the cast material itself (for example through recesses in a moulding compound on the basis of projections from a support plate model), the introduction of pins during casting offers the advantage that the pins cannot be sheared off and are anchored better in the lining support plate.

The introduction of the pins by casting round also avoids machining steps on the cooled cast lining support plate in order to create retaining elements. These machining steps on the one hand require additional processing time and costs and on the other hand are more difficult to carry out with cast materials than with steel.

In the method referred to above the recesses in the support plate pattern can be provided with a plurality of different pins. Thus it is possible for the type of pins which are introduced into the support plate pattern to be varied within the surface of the support plate patterns provided with the recesses in order to control the type and/or the thickness of the anchoring in different regions of the support plate. For example, in the regions of the support plate which are subjected to particularly high shear forces during braking pins which have particularly good anchoring properties between support plate and friction lining material can be used.

The pins introduced into the support plate pattern are advantageously constructed in such a way that the portions of the pins projecting out of the pattern have at least one portion which tapers towards the lining support surface, i.e. at least one undercut. When the lining support material is pressed together with pins having the undercuts a positive-locking connection which is particularly suitable for absorbing the shear forces occurring during the braking operation is created between the friction lining material and the pins of the support plate. In addition it is possible for the number and the shape of the pins having the undercuts to be adapted to the shear forces prevailing in different regions of the support plate.

It is particularly advantageous if the portions of the pins introduced into the recesses in the support plate pattern have a contouring at least in part which is designed in such a way that the pins can be introduced releasably into the support plate pattern. The contouring should be understood here to mean any surface configuration of the pin portions which deviates from a smooth-walled cylindrical or conical pin shape. For example the portions of the pins are provided with grooves or a thread. When the melt is poured into the support plate casting cavity these portions of the pins which protrude into the support plate casting cavity are surrounded by the melt. In this way a particularly good anchoring of the pins in the support plate is achieved.

In the method according to the invention it is advantageous that when the melt solidifies it forms a cast iron with vermicular graphite. The physical properties of cast iron with vermicular graphite lie between those of a cast iron with spheroidal graphite and those of a cast iron with flaked graphite. Advantageously on the one hand the strength and impact resistance of the cast iron with vermicular graphite is higher than in cast iron with flaked graphite and on the other hand the vibration damping is better than in cast iron with spheroidal graphite.

Furthermore, in order to achieve the object stated in the introduction a lining support plate is proposed with a cast metal base plate with a support surface to receive a friction lining material, wherein retaining elements project out of the support surface, characterised in that the base plate is made from cast iron, and that the retaining elements are pins which are cast into the base plate during production thereof in such a way that in each case a portion of the pins projects out of the support surface of the base plate.

Further advantageous and/or preferred variants of the invention are characterised in the subordinate claims.

BRIEF DESCRIPTION OF THE DRAWINGS

The invention is described in greater detail below with reference to a preferred embodiment which is illustrated in the drawings, in which.

DETAILED DESCRIPTION OF THE INVENTION

Figure 1:
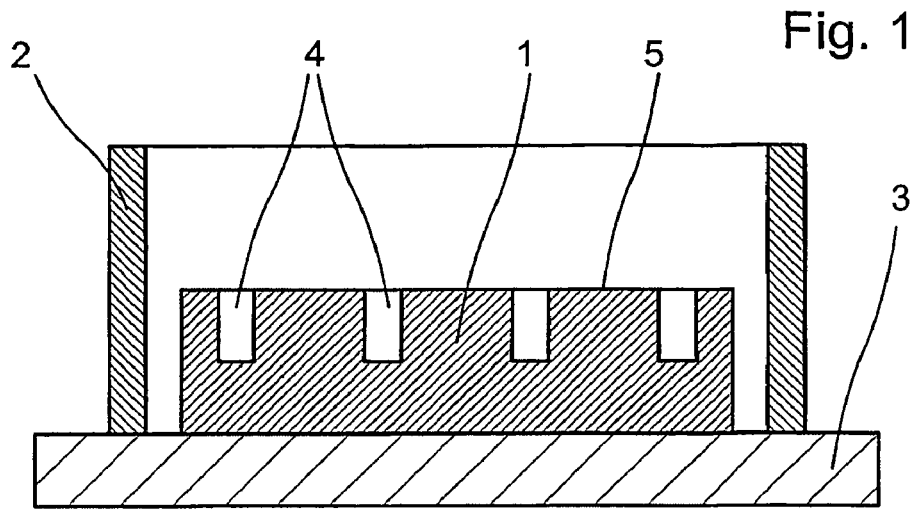
FIG. 1 shows a schematic sectional view of a support plate pattern inlaid into a case.

FIG. 1 shows a schematic sectional view of a support plate pattern 1 inlaid into a case 2. The support plate pattern 1 and the case 2 are disposed on a pattern plate 3. The support plate pattern 1 has a plurality of recesses 4 on the upwardly directed lateral surface 5. The recesses 4 can be uniformly distributed over the lateral surface 5, but they can also be disposed in variably dense distribution in different part-regions, in which the density may be a function of locally acting shear forces during braking. The recesses 4 are preferably bores of identical diameter (simple production). Alternatively the recesses 4 can have different diameters in different regions of the lateral surface 5.

Figure 2:
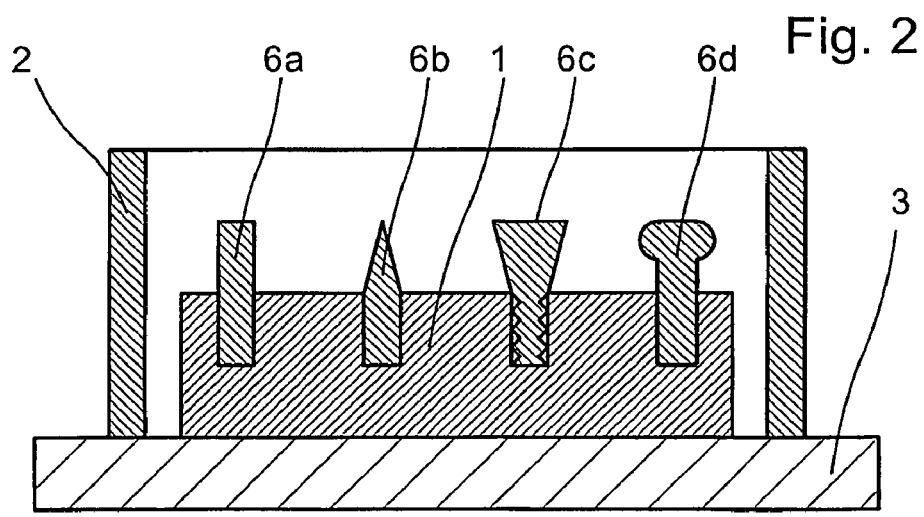
FIG. 2 shows a schematic sectional view of a support plate pattern inlaid into a case with pins introduced into the support plate pattern.
Figure 3:
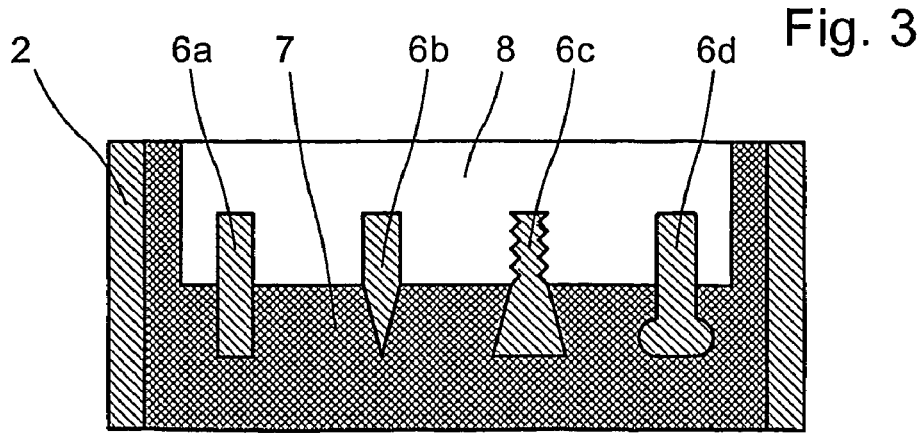
FIG. 3 shows a schematic sectional view of a compressed and/or cured moulding compound with pins disposed in it.

FIG. 2 shows a schematic sectional view of the support plate pattern 1 inlaid into the case 2 with pins 6a to 6d introduced. As is indicated schematically in FIG. 2, the portions of the pins 6a to 6d projecting out of the support plate pattern 1 can be of differing constructions. However, for reasons of simple production the pins introduced into the recesses 4 are preferably of the same shape and size. The pins can be constructed as circular cylinders 6a or as cylinders 6d which taper towards the end of the portion projecting out of the support plate pattern 1. For improved anchoring of the pins 6a to 6d in a friction lining material the portions of the pins which project out of the support plate pattern 1 can have undercuts or can be of at least partially club-shaped construction, as is indicated in the case of the pins 6c and 6d. The portions of the pins 6a to 6d which protrude into the support plate pattern 1 can be of cylindrical construction with smooth walls. However, in order to produce a better anchoring in the casting these portions preferably have a contouring, i.e. for example peripheral grooves or a peripheral thread, as is indicated in the case of the pin 6c.

After the support plate pattern 1 has been provided with a plurality of pins 6a to 6d a moulding compound 7 is applied to the support plate pattern 1. Then the applied moulding compound 7 is compressed and/or cured. This can take place for example by the application of pressure to the moulding compound. Furthermore, it is possible to compress and/or to cure the moulding compound 7 by vibration and/or heating.

After the compression and/or curing of the moulding compound 7 it is rotated by 180° with the case 2 and the support plate pattern 1 along the longitudinal axis of the pattern. Then the support plate pattern 1 is removed from the moulding compound 7 in such a way that the portions of the pins 6a to 6d which project out of the support plate pattern 1 in FIG. 2 remain in the moulding compound. After the support plate pattern has been removed from the moulding compound 7 it is covered with a second compressed and/or cured moulding compound. The moulding compound 7 and the second moulding compound form a support plate casting cavity 8. The second moulding compound 7 has at least one riser and one sprue. In the support plate casting cavity 8 formed by the moulding compound 7 and the second moulding compound a melt is poured in via the sprue, whereby the portions of the pins 6a to 6d protruding into the support plate cavity 8 are surrounded by the melt. Gases located in the support plate cavity 8 and/or produced during the melting operation can escape through the riser.

In the support plate casting cavity the melt is then left to solidify in such a way that a cast iron support plate, preferably a cast iron support plate with vermicular graphite, is formed. After the solidification of the melt the cast iron support plate is released from the casting mould. The riser and the sprue are separated from the cast iron support plate and any moulding compound still adhering is removed for example by sand blasting apparatus.

Within the scope of the idea underlying the invention numerous alternative embodiments are conceivable. For example, covering of the moulding compound 7 by a second mould can be omitted. The melt is then poured and metered into the moulding compound 7. Shaping of the melt which is not delimited at the top takes place by the force of gravity.

The invention claimed is:

1. A lining support plate with a cast metal base plate with a support surface to receive a friction lining material, wherein a plurality of retaining elements project out of the support surface, characterised in that the base plate is made from cast iron, and that the retaining elements are individual pins which are cast into the base plate during the production thereof, and wherein a first portion of each pin protrudes into the base plate below the support surface and a second portion of each pin projects out of the support surface of the base plate.

2. A lining support plate as claimed in claim 1, characterised in that the base plate is produced from cast iron with vermicular graphite.

3. A lining support plate as claimed in claim 1, characterised in that the second portions of the pins projecting out of the base plate have undercuts to anchor the pins in the friction lining material.

4. A lining support plate as claimed in claim 1, characterised in that the first portions of the pins cast into the base plate during production thereof are contoured and surrounded by the cast iron of the base plate.

5. A lining support plate as claimed in claim 1, wherein a friction lining material with an organic binder is pressed onto the support surface.

\* \* \* \* \*